Nov. 11, 1924.  
J. HORRIDGE  
1,514,617  
CLUTCH  
Filed June 6, 1921

INVENTOR:  
James Horridge  
By Wm Wallace White  
ATTY.

Patented Nov. 11, 1924.

1,514,617

UNITED STATES PATENT OFFICE.

JAMES HORRIDGE, OF BOLTON, ENGLAND, ASSIGNOR TO JOHN HETHERINGTON AND SONS LIMITED, OF MANCHESTER, ENGLAND.

CLUTCH.

Application filed June 6, 1922. Serial No. 566,432.

*To all whom it may concern:*

Be it known that I, JAMES HORRIDGE, a subject of the King of Great Britain, residing at Bolton, in the county of Lancaster, England, have invented new and useful Improvements in or Relating to Clutches, of which the following is a specification.

The invention relates to improvements in or relating to clutches and has for its object to provide a device of this character which will be simple in its action, inexpensive to produce, efficient in use and by means of which a stationary part may be instantaneously coupled with a rotating part without jar or shock.

In the accompanying drawings—

Figure 2:
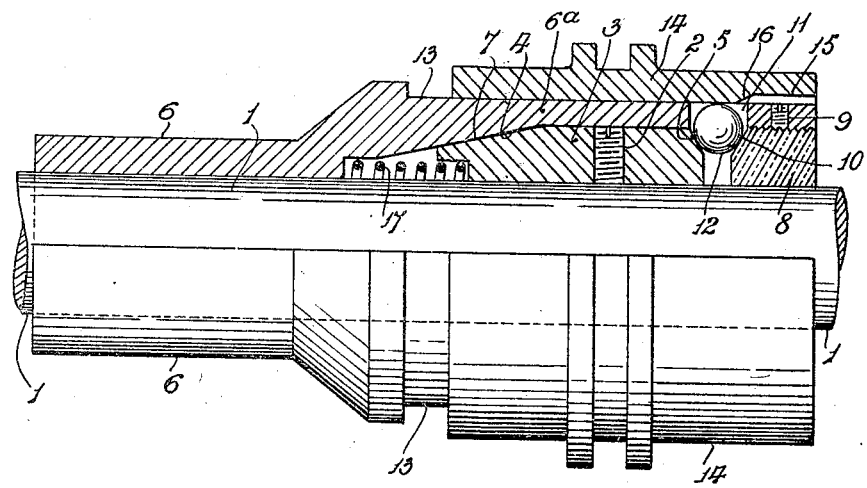
Figure 1:
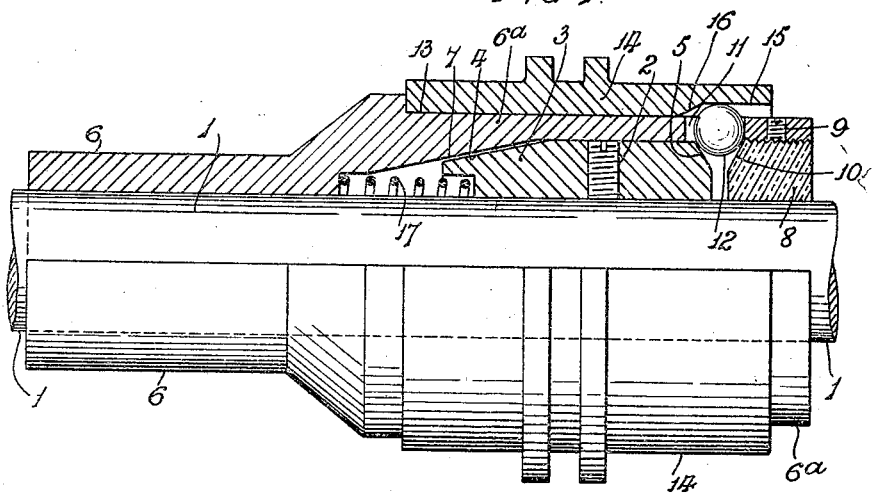

Figure 1 is an elevation partly in section of a clutch constructed according to the present invention showing the same in its open position and Figure 2 is a similar view to Figure 1 showing the clutch in its closed or clutching position.

Referring to the drawings, 1 represents a shaft upon which is fixed, by any suitable means but preferably by a set screw 2 as shown, a block or sleeve 3 which at one end is furnished with a gradual incline or taper 4 and the other end of said sleeve 3 is bevelled or chamfered as shown at 5.

Loosely mounted upon the shaft 1 is a sleeve 6 which is adapted to have fixed thereon a pulley, chain wheel or the like (not shown), by means of which it may be rotated by any independent means and said sleeve 6 is furnished with a longitudinal extension 6ª of enlarged diameter which embraces the block or sleeve 3 as shown and is provided with an internal taper or incline 7 which corresponds with that 4 of the sleeve 3 and acts in conjunction therewith in the manner hereinafter described.

The end of the extension 6ª of the sleeve 6 is open and internally threaded and screwed thereinto is an exteriorly threaded ring 8 which embraces the shaft 1 with capability of sliding thereon, a set screw 9 being employed to prevent the said ring becoming unscrewed.

The ring 8 is provided with a bevel or chamfer 10 for the purpose hereinafter described while in the extension 6ª are several holes or perforations 11 and within each of which and resting upon the bevels or chamfers 5 and 10 is a ball 12.

The periphery of the extension 6ª of the sleeve 6 is provided with a recess 13 which acts as a slide and in which is mounted with capability of sliding an outer sleeve 14 which may be actuated by any well known arrangement of connections from a lever, handwheel, or the like (not shown) and the end of the sleeve 14 is furnished with an internal recess 15 approached by an incline or bevel 16.

In the position illustrated at Figure 1 the clutch is shown in its open position, that is to say the sleeve 6 rotates freely upon the shaft 1.

Upon sliding the sleeve 14 towards the right hand of the drawing, the incline 16 will strike the ball 12 and force the same inward towards the shaft 1 into the position indicated in Figure 2 and the movement of the sleeve is continued until the level portion of the interior surface of the same bears upon said ball 12 thus preventing the same from moving outwards, that is, away from the shaft 1.

In its inward movement the ball 12 by virtue of the bevel or chamfer 10 acts upon the ring 8 in a cam or wedge like manner and forces the ring 8 away from the sleeve 3 and as said ring is fixed with the extension 6ª it draws the same with it in its movement thus bringing the inclined surfaces 4 and 7 into contact one with the other thus clutching the sleeve 6 with the sleeve 3 and consequently with the shaft 1 the parts assuming the position indicated in Figure 2.

In order to open the clutch the sleeve 14 is moved to the left hand of the drawing, when a spring 17 interposed between the end of the sleeve 3 and the sleeve 6 will force the clutching surfaces 4 and 7 apart and at the same time through the extension 6ª and ring 8 force the ball 12 outward into the recess 15 of the sleeve 14 the parts assuming the position shown in Figure 1.

It will be obvious that the details of construction of the device may be modified without departing from the principle of the invention.

What I claim as my invention and desire to secure by Letters Patent of the United States is:—

A clutch, comprising, in combination, a rotatable shaft, an inner clutch member secured to said shaft for rotation therewith, an outer clutch member mounted for rotation on said shaft, said clutch members having cooperating conical clutch faces and said outer clutch member having a sleeve portion encircling the inner clutch member and extending beyond the same, a ring mounted for rotation on said shaft and secured within said sleeve portion contiguous to one end of the inner clutch member, said ring and inner clutch member forming between them an annular opening having inclined sidewalls, said sleeve portion being provided with a circumferential row of radially extending openings, a ball in each of said openings, and a sleeve mounted for sliding movement on the extended sleeve of the outer clutch member and encircling the ball carrying portion of said clutch member, said slidable sleeve being adapted when slid in one direction to force said balls into said annular opening between the ring and inner clutch member.

In testimony whereof I have signed my name to this specification.

JAMES HORRIDGE.